No. 673,627. Patented May 7, 1901.
C. B. RUSSELL.
COMBINED HEATING AND COOK STOVE.
(Application filed Mar. 28, 1900.)
(No Model.) 2 Sheets—Sheet 1.
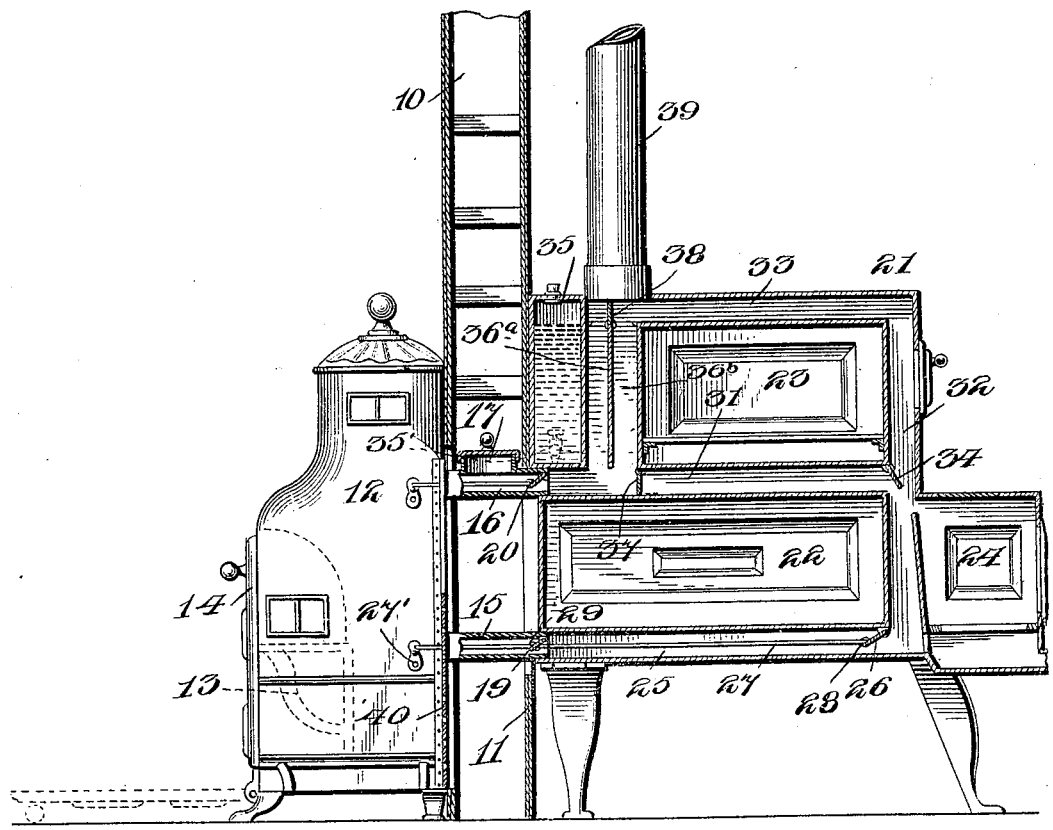
Witnesses
Geo. H. Byrne.
W. J. Bernhard.
C. B. Russell.
Inventor
By E. G. Siggers
Attorney

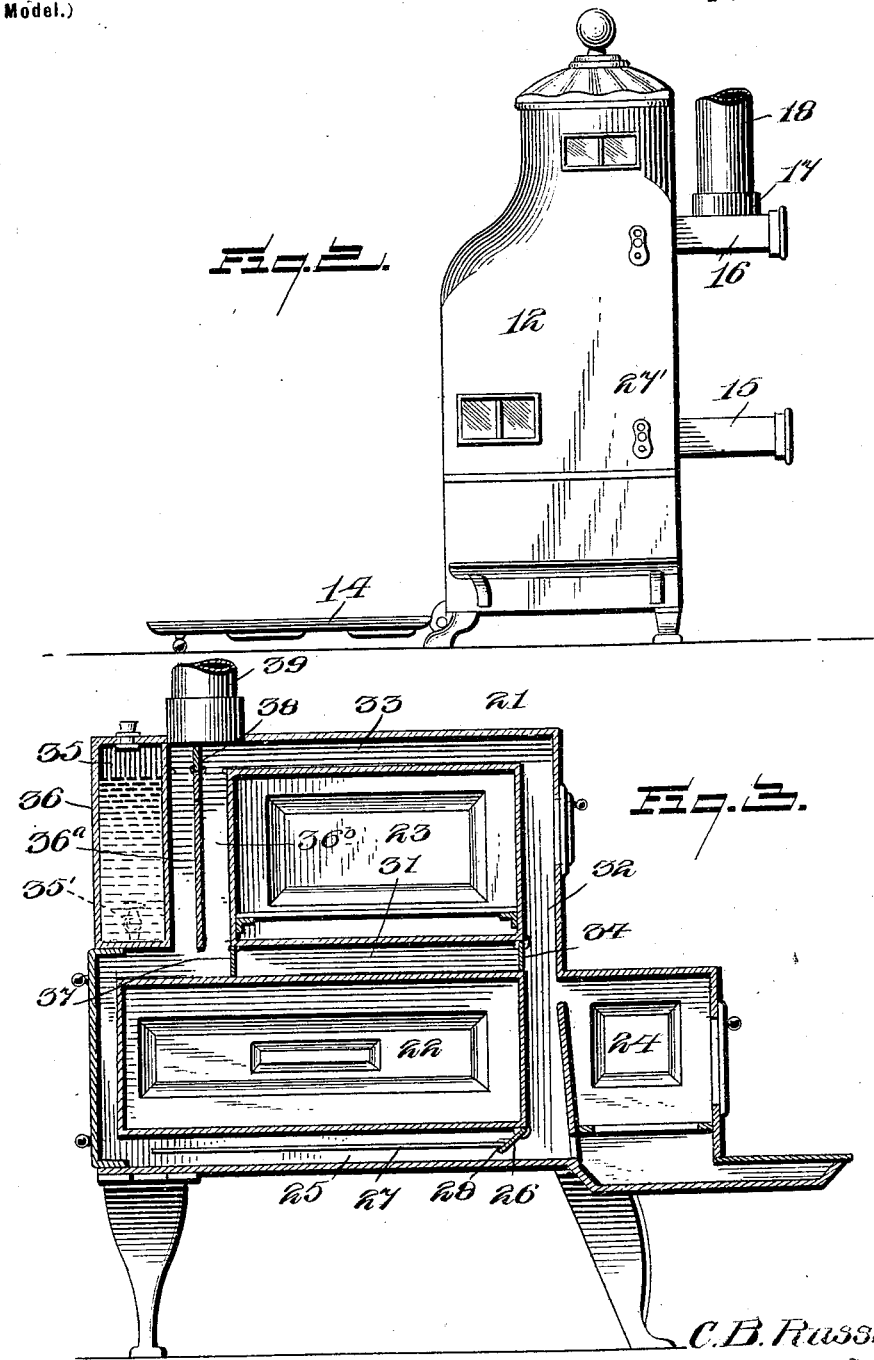

UNITED STATES PATENT OFFICE.

COURTLAND B. RUSSELL, OF JOPLIN, MISSOURI.

COMBINED HEATING AND COOK STOVE.

SPECIFICATION forming part of Letters Patent No. 673,627, dated May 7, 1901.

Application filed March 28, 1900. Serial No. 10,514. (No model.)

*To all whom it may concern:*

Be it known that I, COURTLAND B. RUSSELL, a citizen of the United States, residing at Joplin, in the county of Jasper and State of Missouri, have invented a new and useful Combined Heating and Cook Stove, of which the following is a specification.

My invention relates to a combined heating and cook stove; and the primary object in view is the provision of an improved structure by which economy of fuel is attained for the dual purposes of heating a kitchen and a dining or sitting room and for cooking food as compared with the cost required for the fuel necessary to supply the ordinary independent arrangement of separate heating and cooking stoves located in the isolated rooms of a house.

A further object is to arrange the parts with a view of increasing the ease and facility in the control of the combined stove, so as to make the cook-stove utilize alone the waste heat from the heating-stove or to enable a fire to be independently maintained in the cook-stove, and thus the heat of the two stoves may be jointly utilized.

A further object is to secure the ready separation of the combined stove into a heating-stove and a cook-stove for use as independent structures and also to equip the cook-stove with a hot-water appliance, which may be heated simply by waste heat from the heating-stove.

Further objects and advantages of the invention will appear in the course of the subjoined description, and the novelty in the construction and combination of parts will be defined by the claims.

In the drawings, Figure 1 is a sectional elevation of a partition, illustrating the arrangement of the combined stove with relation thereto. Fig. 2 is a view of the heating-stove detached. Fig. 3 is a sectional elevation of the cook-stove.

The same numerals of reference are employed to indicate corresponding parts in each figure of the drawings.

The most common method of heating houses and of cooking food contemplates the employment of a heating-stove in a dining or sitting room and a cook-stove in the kitchen, the last-named stove being employed for the purpose of cooking food and of heating the apartment. Of course the kitchen is separated from the dining or sitting room by an intermediate partition; but this method requires the two stoves in the respective compartments to be supplied with fuel independently, thus maintaining separate fires. According to my invention I provide a combined structure the individual members of which are located in the kitchen and the dining-room, and which members are connected operatively together and provided with suitable controlling devices for the purpose of permitting the heat and products of combustion from the heating-stove or the member located in the dining-room to pass into and circulate through the cook-stove or the member located in the kitchen, whereby the cook-stove may be kept in a warmed condition for the purpose of radiating the heat in the kitchen that may be supplied thereto through the stove located in the dining-room.

The numeral 10 indicates the partition or division-wall, which separates the dining or sitting room from the kitchen of a dwelling-house or other structure, said partition being provided with a transverse opening 11, the width of which is equal to the width of the cook-stove. This partition may be a brick wall, with the opening 11 therein arched, or the partition may be of any other construction and suitably equipped with means which resist the action of the heat from the combined stove. That member of the combined stove which is to be located in the dining or sitting room is indicated by the numeral 12, and to distinguish this member from the other member, which is located in the kitchen, I will designate the member 12 as the "heating member" or "heating-stove." It is my preference to construct this heating member or stove 12 with an internal grate 13 and a drop-front 14, the latter being hinged to the stove structure and adapted to be moved to the horizontal position indicated by dotted lines in Fig. 2 for the purpose of removing ashes from said stove member without soiling the floor or carpet. This heating member 12 is provided on its rear side with the horizontal collars 15 16, the same being arranged in position one above the other. The upper stove-collar is provided with an upstanding pipe-nipple 17, on which may be fitted the lower extremity of a smoke-pipe 18 when the heating member 12 of the stove is adapted for use individually. The pipe-collars 15 16 of the heating-stove member are provided with dampers 19 20, the same being located in the open rear ends of said collars and adapted to be operated by suitable devices for the purpose of permitting the smoke and products of combustion from the heating member to pass into the cooking member 21 of the combined structure.

One of the important features of my invention consists in arranging the collars 15 16 to extend through the opening 11 in the partition and to operatively connect said collars with the heat-circulating flues of the cooking member 21 of the combined stove. This cooking member 21 is situated within the kitchen apartment of the dwelling at a point close to the partition 10, and said member 21 is shown by Fig. 3 of the drawings as constructed with a lower oven 22 and an upper oven 23. The front part of the cook-stove is furnished with a fire-box 24 of any approved construction and adapted to discharge the products of combustion into one of the flues which surround the upper oven-chamber 23. The cooking member 21 has a lower horizontal flue 25, in the front part of which is arranged a damper 26, said flue and damper of the cooking member being disposed in the same horizontal plane as the collar 15 and the damper 19 of the heating member 12 of the stove. A single rod 27 is provided for the operation of the dampers 19 26 at the lower part of the combined stove structure, said damper-operating rod passing through the opening 11 of the partition or division-wall and the lower flue 25 of the cooking member. This rod is connected pivotally at 28 to the damper 26 and at 29 to the damper 19, the free end of the rod being extended beyond the partition 10 into the dining or sitting room of a dwelling, so as to receive an operating rod or handle 27', that may be easily pushed by a person stationed in the dining or sitting room.

The cooking member 21 of the combined stove is furthermore provided with a middle flue 31, which is located between the lower and upper oven-chambers 22 23, said middle flue being disposed in the horizontal plane of the collar 16 on the heating-stove member. This middle flue opens at its front end into the vertical front flue 32 of the cooking member, said flue 32 being in communication with a top flue 33. A damper 34 is provided in this middle flue 31 at a point to control the passage of the products of combustion from the flue 25 into the flue 31 or from the flue 31 into the vertical front flue 32, said damper 34 being operable independently of either of the other members of the combined stove structure.

It is my purpose to also provide the cooking member of the combined stove with a water-heating tank 35 and a suitable faucet 35', by which the water may be drawn off from time to time. This heating-tank is arranged in the upper part of the cooking-stove member substantially in the horizontal plane of the upper oven-chamber 23, thus disposing the tank above the middle flue 31. This tank 35 is in spaced relation to the upper oven-chamber 23 for the purpose of forming a direct-draft back flue 36, the lower end of which opens into the middle flue 31 and the upper end communicates with the top flue 33. The other side wall of this direct flue 36 is defined by a vertical partition $36^a$, separating the direct flue 36 from the back flue $36^b$ of the upper oven. A damper 37 is mounted within the stove structure 21 at a point to control the flow of the products of combustion through the flue 31 or to direct the same into the direct back flue 36 by closing the flue $36^b$, and another damper 38 is provided at the top of the partition to control the flow of the products of combustion from said back flue $36^b$ into the top flue 33, this damper being arranged to close either flue 36 or $36^b$, as desired. Ordinarily a stovepipe 39 is employed in connection with the cooking-stove member 21 to carry off the products of combustion from the heating and cooking members of the combined stove structure.

In assembling the parts of my improved stove structure in operative relation the heating member 12 is first equipped with a perforated plate 40, which is riveted to the sides of the member, near the rear thereof. The cooking member of the stove within the kitchen is first brought into abutting relation to the partition 10 for the horizontal flues 25 31 to be in communication with the opening 11 of the partition. The other member 12 of the combined stove within the dining or sitting room is now brought close up to the partition for the collars 15 16 to pass through the opening in the partition and to enter the rear open ends of the flues 25 31, respectively, of the cooking member 21 of the stove. In starting the fire in the stove the fuel is placed on the grate 13 of the stove member 12, the damper 20 is opened, and the damper 38 is turned into its vertical position to permit the smoke and products of combustion to pass through the collar 16 and part of the flue 31, the back flue 36, and thence into the pipe 39, all the other dampers being closed. The heat and products of combustion circulate beneath the bottom and in contact with one wall of the tank 35, thus heating the water contained in said tank. Of course the heat radiating from the member 12 warms the apartment in which it is located; but either of the dampers 19 20 in the stove member 12 or the dampers 26 34 37 of the cooking-stove member 21 may be opened for the heat to circulate through the stove member 21 and be radiated thereby into the kitchen for the purpose of heating the latter in very cold weather or for keeping the stove member 21 in a warm condition over night. To utilize the upper oven-chamber 23 for cooking purposes, the damper 38 should be closed, and the dampers 20, 34, and 37 should be opened for the heat to circulate through the flues 31, 32, and 33, thus directing the heat around the oven-chamber 23. To utilize the waste heat from the heating member 12, the damper-rod 27 may be pulled upwardly in order to move the dampers 19 26 to their open positions, and the heat may then circulate around the lower oven-chamber, the dampers 34 37 being open. Of course the fire may be started and maintained in the fire-box 24 of the cooking member 21, and in this event the heat may be cut off from passing from the member 12 into the member 21, although the heat from both stove members may be utilized jointly in the cooking-stove member 21, as the heat radiated from the heating-stove will be a more or less important factor in the heating of the cooking-stove. Any ordinary system of flues may be employed in the heating-stove so long as the arrangement is such that the circulation of the products of combustion may be obtained through the cooking-stove. Thus the heating and cooking stoves or members are so organized that the products of combustion from either may pass to the other—that is to say, if the fire is built in the heating member the products of combustion may pass into the flue system of the cooking member for the purpose of keeping the latter warm, or if the cooking member is being used for cooking purposes the products of combustion may pass into and circulate through the heating member.

It will be observed that the two parts or members which together constitute the combined stove may be separated one from the other and said parts employed as separate stoves for individually heating the dining-room and the kitchen. Under these conditions the dampers 19 and 20 close the exits through the collars 15 16 of the heating member and the pipe 18 is fitted to the nipple on the upper collar. Any suitable means may be adopted for closing the upper rear ends of the flues 25 31 in the cooking-stove member 21—such, for example, as a metallic sheet bent or struck up in proper form to closely embrace the rear part of the stove member 21, but separated from the back of the bottom oven to provide a back flue for said lower oven when the cooking member is used independently.

It is evident that each stove member should be supplied with the usual accessories common to ordinary stoves; but as these parts are ordinary in the art I have not considered it necessary to illustrate and describe the same fully.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what is claimed as new, and desired to be secured by Letters Patent, is—

1. In combination, a plurality of stove members each comprehending a complete and independently-operative stove structure, and means for establishing communication between said members to permit the products of combustion to pass from either of them into the other.

2. The combination with a cooking-stove member and a heating-stove member, each comprehending a complete stove structure, of collars effecting communication between said members to permit the products of combustion to pass from either of them to the other.

3. The combination with a partition provided with an opening, of stove members upon opposite sides of said partition and each comprehending a complete stove structure capable of independent operation, of collars extended from one stove member, and passed through the openings in the partition and into the flues of the other stove member, whereby the heat and products of combustion may pass from either member into the other.

4. The combination with a partition having an opening, and a cooking-stove member situated on one side of said partition and provided with circulating-flues having open rear ends, of a heating-stove member disposed on the opposite side of the partition and provided with collars passed through the openings in the wall and into the open rear ends of the cooking-stove flues to establish direct communication between the heating and cooking stoves to permit the products of combustion to pass from either to the other, and dampers located in the flues of the cooking-stove member to control the circulation of the products of combustion.

5. In a combined heating and cooking stove, the combination with complete and independently-operative heating and cooking members coupled together to effect direct communication between them to permit the products of combustion to pass from either of said members into the other, a heating-tank within the cooking member, flues surrounding the tank, and dampers controlling the flues.

6. The combination with a complete cooking-stove member capable of independent operation and provided with oven-chambers separated from each other and surrounded by circulating-flues and also provided with a heating-tank disposed in spaced relation to one of the oven-chambers to form an intermediate flue, a heating-stove member separably coupled to the cooking-stove member and in direct communication with the flue system thereof to permit an intercirculation of the products of combustion in either direction, and means for controlling the circulation of said products of combustion.

7. In a combined heating and cooking stove, a cooking-stove member provided with the upper and lower oven-chambers surrounded by the circulation-flues 25, 31, 32 and 33, the horizontal flues 25, 31 being open at the rear of the stove, a tank 35 forming one wall of a back flue 36, a heating-stove member having the collars in communication with the open ends of the flues 25, 31, the dampers in said collars, a damper 26 in the lower flue 25, a single operating-rod connecting said damper 26 and the damper in the lower collar, the dampers 37, 38 controlling the back flue, and another damper 34 in the flue 31 of the cooking-stove member, substantially as described.

8. In a combined heating and cooking stove, the combination with complete and independently-operative heating and cooking members, of coupling means establishing communication between said members at a plurality of points to permit free intercirculation of the products of combustion through both members before being discharged from either member into a stovepipe.

In testimony that I claim the foregoing as my own I have hereto affixed my signature in the presence of two witnesses.

COURTLAND B. RUSSELL.

Witnesses:
  EMERY A. PIM,
  SUSIE P. MILLESS.